(12) United States Patent
Morris et al.

(10) Patent No.: US 8,416,688 B2
(45) Date of Patent: Apr. 9, 2013

(54) AUTOMATIC ADAPTIVE NETWORK TRAFFIC PRIORITIZATION AND SHAPING

(75) Inventors: Keith J. Morris, Cupertino, CA (US); David J. Hudson, Sandbach (GB); Ankur Goyal, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 133 days.

(21) Appl. No.: 12/268,375

(22) Filed: Nov. 10, 2008

(65) Prior Publication Data

US 2009/0067328 A1    Mar. 12, 2009

Related U.S. Application Data

(63) Continuation of application No. 10/968,549, filed on Oct. 18, 2004, now Pat. No. 7,460,476.

(51) Int. Cl.
*G01R 31/08* (2006.01)
*H04L 12/28* (2006.01)

(52) U.S. Cl. ..................... 370/230.1; 370/401

(58) Field of Classification Search ............ None
See application file for complete search history.

(56) References Cited

U.S. PATENT DOCUMENTS

| | | | | |
|---|---|---|---|---|
| 6,363,429 B1 * | 3/2002 | Ketcham | .......... | 709/235 |
| 7,324,447 B1 * | 1/2008 | Morford | .......... | 370/231 |
| 2002/0087716 A1 * | 7/2002 | Mustafa | .......... | 709/236 |
| 2002/0099854 A1 * | 7/2002 | Jorgensen | .......... | 709/249 |
| 2002/0120767 A1 * | 8/2002 | Oottamakorn et al. | ....... | 709/235 |
| 2002/0141339 A1 * | 10/2002 | Konuma | .......... | 370/229 |
| 2002/0154641 A1 * | 10/2002 | McGowan | .......... | 370/401 |
| 2002/0163914 A1 * | 11/2002 | Dooley | .......... | 370/394 |
| 2003/0235209 A1 * | 12/2003 | Garg et al. | .......... | 370/468 |
| 2004/0125815 A1 * | 7/2004 | Shimazu et al. | .......... | 370/411 |

\* cited by examiner

*Primary Examiner* — Eunsook Choi
(74) *Attorney, Agent, or Firm* — Peter M. Kamarchik; Nicholas J. Pauley; Jonathan T. Velasco

(57) ABSTRACT

A local area network includes computers and peripherals networked in a high-speed LAN with access to a WAN through a slower connection via a broadband modem. A LAN gateway device manages data traffic between the local computers and peripherals and between the LAN and the WAN. The LAN gateway device provides multiple features, such as wired or wireless links, security, firewall, NAT, DCHP, traffic management, and the like. Traffic management features include an automatic quality of service priority classification scheme. A quality of service module automatically assigns priorities to the data streams based on analysis of the data packets. A configuration access list can be provided with pre-configured priorities for some streams. Initially, all streams are given highest priority and subsequently the priority is automatically adapted to the results of the packet analysis. Traffic shaping techniques control the LAN gateway upstream output and enable IP fragmentation of TCP packets according to measured upstream channel conditions.

24 Claims, 6 Drawing Sheets

AUTOMATIC ADAPTIVE NETWORK TRAFFIC PRIORITIZATION AND SHAPING

CROSS REFERENCE TO RELATED APPLICATIONS

This application is a continuation of U.S. patent application Ser. No. 10/968,549, titled "Automatic Adaptive Network Traffic Prioritization And Shaping," filed Oct. 18, 2004 which is incorporated by reference herein in its entirety.

BACKGROUND OF THE INVENTION

1. Field of the Invention

The present invention relates generally to small office/home office ("SOHO") and home networking, and more particularly, to automatic and adaptive network traffic prioritization and shaping.

2. Description of the Related Art

Conventional SOHO and home networks are typically local area networks ("LAN") that include several computing devices interconnected either through wires or wireless links. Typically, the SOHO/home LAN includes one or more network devices that provide access for other network devices to a wide area network ("WAN"), most commonly the Internet. These network devices are sometimes called home routers or gateways. In the typical SOHO/home LAN, home routers or gateways manage communications with the WAN and serve as a central point for sharing files and resources in the LAN. These devices are generally referred to as gateways.

There are multiple features that can be included in such gateways. Some of these features include hardware firewalls, wireless network access points, network address translation ("NAT"), dynamic host configuration services ("DHCP"), content filtering, ad blocking, virtual server functions, wireless networking/security functions, and the like.

Generally, the conventional SOHO/home gateway is connected to a modem device that provides the physical link to the WAN. Modem devices are typically broadband modems, such as cable modems, digital subscriber line ("DSL") modems, and the like. The upstream connection between the modem device and the WAN is generally of substantially less data transfer capacity than the downstream connection. Further, the upstream connection is also slower than the intra LAN communications, which tend to be symmetrical high bandwidth capable connections. For example, LANs may operate at data rates in the hundreds of Megabits per second ("Mbps") to Gigabits per second ("Gbps") while the WAN uplink data speed may only be between 128 and 256 Kilobits per second ("Kbps"). This poses a data delay problem for data transfers from the LAN to the WAN, primarily in the upstream connection or uplink. For some software applications this data delay problem can result in a degraded user experience, performance degradation, or malfunction.

In the conventional SOHO/home network environment, SOHO/home networks routinely carry data traffic for multiple applications concurrently, generally from different computer systems in the LAN. Some of these applications are high bandwidth asynchronous applications for which latency is not a requirement. These applications typically operate based on large data packets to optimize their throughput by including the highest amount of payload data per packet. For example, electronic mail and file transfer applications fall in this category of applications. Other applications are more sensitive to data transfer delays, requiring low latency data traffic or a higher quality of service ("QoS"). For example, in multi-user gaming applications, voice over Internet Protocol ("VoIP") applications, other voice and video applications and other applications requiring real-time data transfers, delays can cause significant degradation in performance when operating in the typical SOHO/home network environment.

Conventional routers employ a "best-effort" approach to managing the data traffic congestion. Routers queue packets into the data buffer of the modem device on a first-in/first-out ("FIFO") approach. Using this approach, some packets of applications that require a higher QoS end up queued behind large high bandwidth packets, which result in an undesirable and some times critical delay. For example, in the gaming context, data delays may impact the application by producing different results at the local computer than those produced at the game server or peer computer across the WAN, e.g., the user may hit a target in his local computer but by the time the data gets to the peer gaming computer the hit is a miss. Similarly, in the VoIP context, initially, short data delays may be simply an annoyance, as the delay increases, e.g., over 200 ms, users begin talking over each other, and as the delay gets worse, packets begin dropping and the sound starts breaking up.

Additionally, conventional SOHO/home gateway devices also negatively impact applications that require a large quantity of multiple simultaneous connections. In part, this negative impact is due to the operation of the transmission control protocol/Internet protocol ("TCP/IP"), the dominant protocol in SOHO/home office networks and in Internet computing generally. The TCP/IP protocol tries to optimize the use of available bandwidth by distributing the bandwidth among different connections. However, when a large number of connections are established, new connections may not be able to get through the uplink connection once the bandwidth is occupied by other pre-existing connections. For example, if a peer-to-peer ("P2P") file sharing application is running on the LAN establishing hundreds of connections with peer computers across the WAN, a new connection required by a VoIP or gaming application may not be possible. A connection request issued by one of these applications may expire before the TCP/IP bandwidth sharing scheme allocates bandwidth for the new connection.

In the enterprise/service provider networking technology some approaches have been taken for solving this problem. For example, traffic management techniques are used to manually configure, prioritize, and shape the traffic at each interface in enterprise-networking devices. Network administrators familiar with the operation of the enterprise applications and with access to powerful network management tools can configure and prioritize traffic through the enterprise interfaces. However, this type of solution is inadequate for the general SOHO/home networking user because it requires multiple capabilities and knowledge not likely to be available to the average user.

For example, the application itself must be able to identify or "tag" the data traffic so the router can identify the type of traffic. If the application does not tag the traffic, then the user must be able to identify the traffic type for the router in some other way to allow the router to recognize the application. This type of information is not readily available to most users and some applications change this information on a per session basis, making it difficult for the SOHO/home user to provide lasting configurations.

If the router can identify the traffic type, the user must be able to instruct the router to associate that traffic type with a prescribed behavior supported by the traffic management algorithm in the router. This may involve configuring multiple complex parameters in the router. The router must provide a user interface and include traffic management algorithms to enable the user to provide these configurations. Further, even if the capability is available and the user has the sufficient knowledge to properly configure the traffic management function, currently the behaviors of these systems for any particular traffic type are determined on a per session basis and cannot change within a single session.

Therefore, there is a need for a system and method to provide an ongoing, real-time automatic prioritization of network traffic without requiring user configuration and capable of shaping the data traffic to adjust to channel conditions and changes within the same session.

SUMMARY OF THE INVENTION

The present invention overcomes the problems of conventional SOHO/home network and enterprise network devices by providing a system and method to automatically prioritize network traffic adaptively based on analysis of the data packets without the need of configuration information.

In one embodiment, a LAN gateway device for interfacing a LAN with a WAN, includes a LAN interface for communicating data packets, either by wire or wirelessly, between the LAN gateway device and a set of LAN computers. The LAN gateway device also includes a WAN interface for communicating data packets between the LAN gateway device and remote systems across the WAN. Further, the LAN gateway device includes a core-processing unit coupled to the LAN interface and the WAN interface for routing the data packets to and from the LAN computers and the remote systems across the WAN.

In one embodiment, the core processing unit includes a QoS module that is configured to automatically assign QoS priorities to the data streams. The data streams are established between a LAN computer and a remote system. The QoS priorities are assigned automatically based on analysis of data packets associated with the data streams. The priority assignments are adaptive throughout a session and change in response to changes in the data analysis results.

In one embodiment, a network traffic shaping method includes periodically measuring the uplink channel status (or data rate) and controlling the queue output rate accordingly. Further, the method includes fragmenting large data packets into smaller ones to keep the latency introduced by transmitting low priority traffic within pre-determined bounds.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION OF THE PREFERRED EMBODIMENTS

The Figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Figure 1:
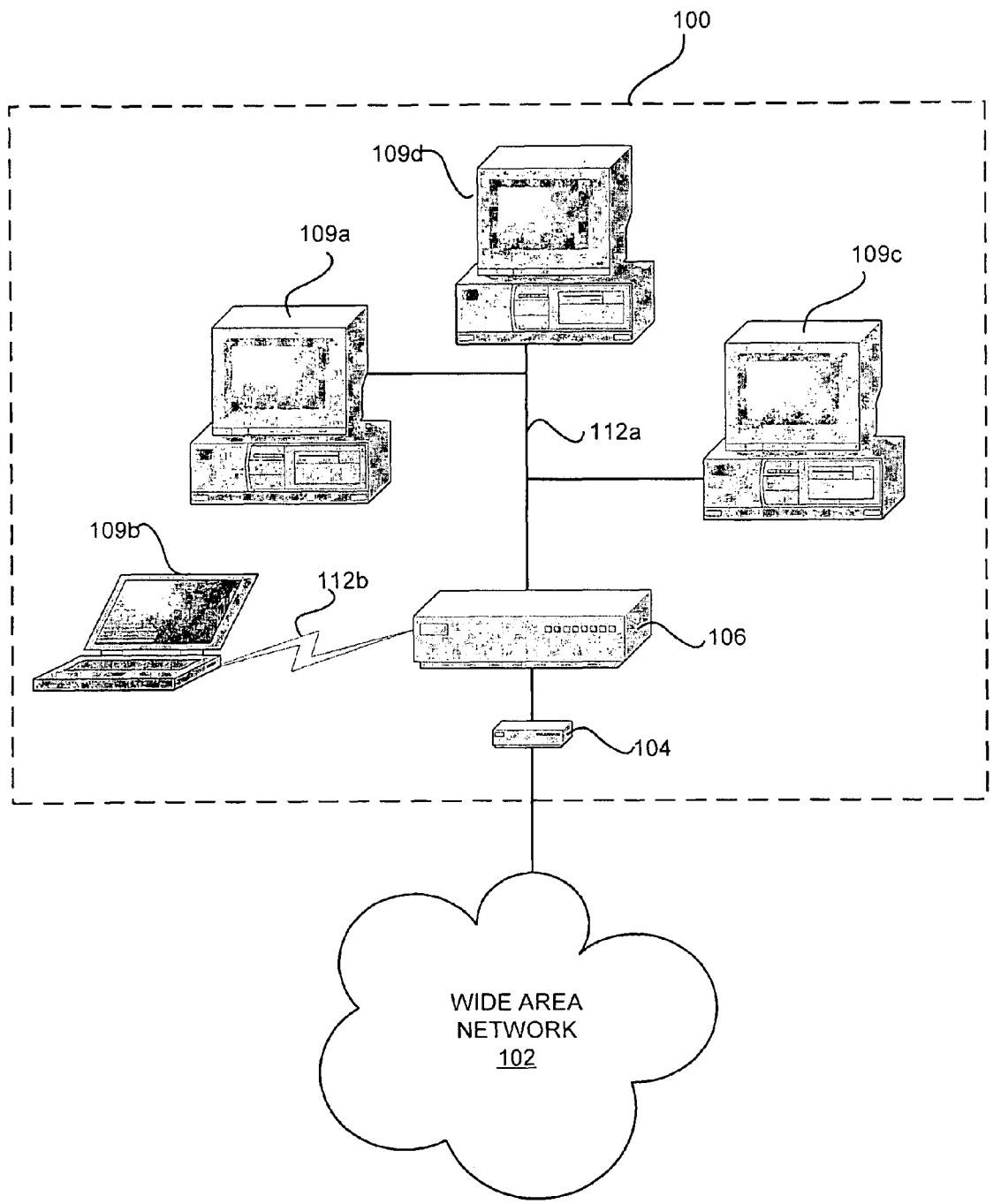
FIG. 1. is a system level diagram of one embodiment of a local area network environment in accordance with the present invention.

Referring now to FIG. 1, a system level diagram of one embodiment of a local area network environment in accordance with the present invention is shown. This description refers to the LAN environment 100 as the local network 100, which may include a SOHO network environment, a home network environment, an enterprise local network environment, e.g., intranet, or other similar local network environments. The local network 100 connects to a WAN 102, such as the Internet, an enterprise network, or the like, to provide broadband services to the local network, e.g. SOHO/home LAN, for example, Internet access, VoIP/video telephony, digital television (e.g., high definition television "HDTV"), and the like. A connection device 104 links the local network 100 with the WAN 102 using a conventional broadband connection, e.g., DSL technology, cable modem technology, digital satellite, T-1, T-3, broadband integrated services digital network ("B-ISDN"), or the like. Other connection methods are possible, such as, dial-up, e.g., 56 Kbps modem, ISDN, or the like, but are not preferred because these slower data-rate technologies are typically not adequate to support data demands of a typical SOHO/home local network 100. Thus, in a preferred embodiment, connection device 104 is a broadband network access device, such as a cable modem or a DSL modem.

In one embodiment, the local network 100 includes a LAN gateway device 106, a plurality of computers, e.g., personal computers, ("PCs") 109*a*, 109*b*, and 109*c* (generally 109), and peripheral devices 108, e.g., IP telephones, network printer, mass storage device, imaging devices (scanners and cameras), media browsers, or the like. Other embodiments of the present invention may include additional network devices, including multiple LAN gateway devices 106, computers 109, peripheral devices 108, and any other network capable devices, e.g., network capable appliances, home security systems, or the like. In one embodiment, computers 109 are conventional personal desktop and/or laptop computers, for example, computers based on microprocessors and architectures like those of Intel Corporation, of Santa Clara, Calif. or Apple Computer, Inc. of Cupertino, Calif. In an alternative embodiment, computers 109 also include other computing devices, such as personal digital assistants ("PDAs"), smart digital televisions, gaming devices, intelligent remote controllers, media browsers, and the like.

LAN gateway devices 106 include conventional functional elements, such as, gateways, hardware firewalls, routers, wireless access points, any combination of these, or other functions. In one embodiment, local network 100 includes a LAN gateway device 106 with natural address translation ("NAT") capabilities, hardware firewall, Dynamic Host Configuration Protocol ("DHCP") functions, and a wireless access point ("WAP"). In addition, the LAN gateway device 106 includes data traffic management functions. The LAN gateway device 106 connects to the network connection device 104 and links the computers 109 among themselves and to the WAN 102. In one embodiment, the LAN gateway device 106 also includes WAN 102 access functionality, e.g., a multi-port router with built in DSL/cable modem functionality, making network connection device 104 unnecessary.

In one embodiment of local network 100, connections 112 are wired (112a) and wireless (112b) network connections. For example, with respect to FIG. 1, network connection 112a is a wired connection (e.g., an Ethernet bus) connecting computers 109a, 109c and 109d to LAN gateway device 106. Similarly, network connection 112b is a wireless network connection (e.g., an IEEE 802.11b, IEEE 802.11g, or similar wireless link) connecting personal laptop computer 109b to LAN gateway device 106. Connections 112 can operate according to one or more LAN protocols, either wired or wireless.

Figure 2:
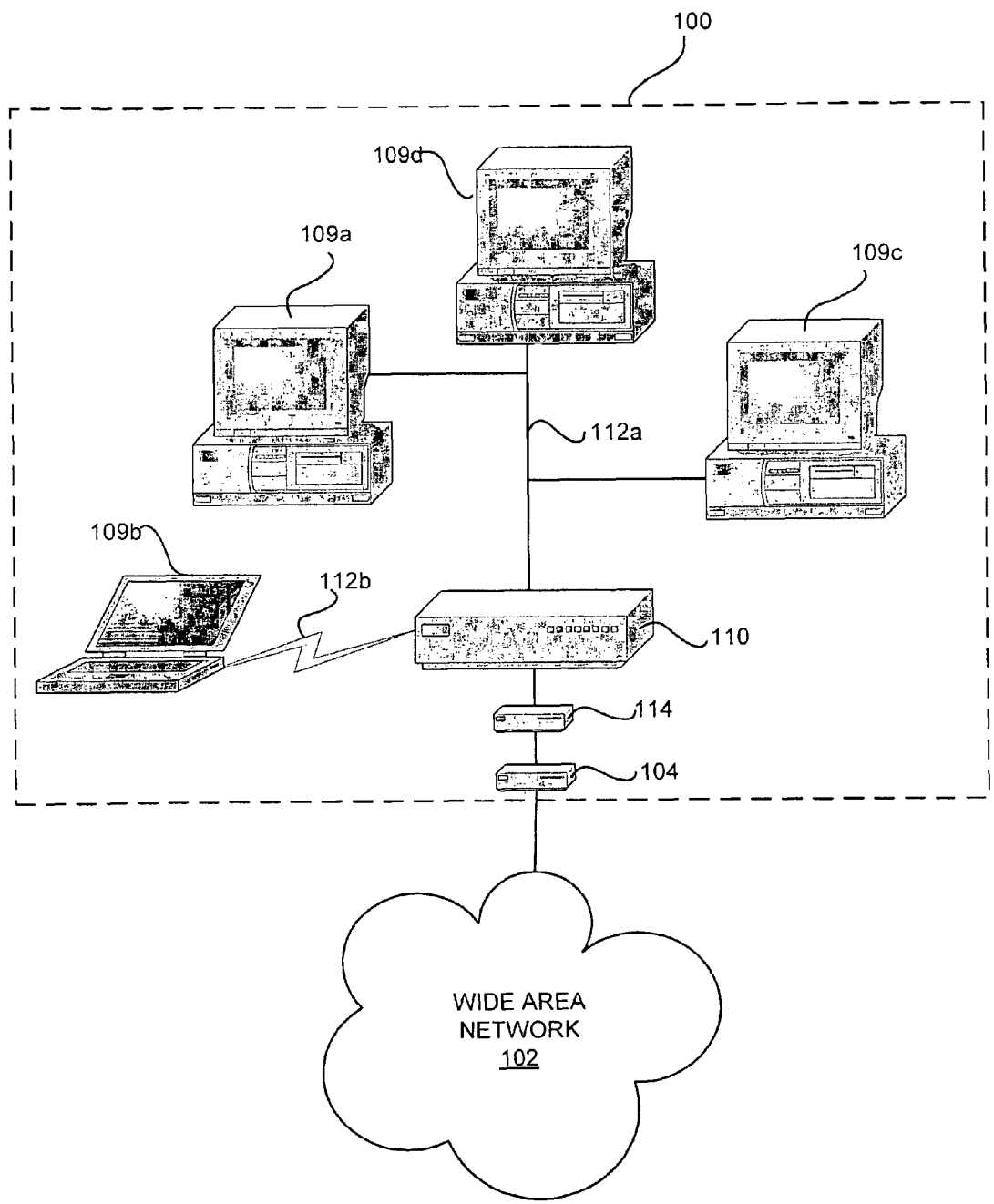
FIG. 2. is a system level diagram of an alternative embodiment of a local area network environment in accordance with the present invention.

Referring now to FIG. 2, a system level diagram of an alternative embodiment of a local area network environment in accordance with the present invention is shown. In this embodiment, a conventional home router 110, such as a 4-port home router, provides connectivity for the computers 109 and peripherals 108 in the local network 100 and further provides access to services from WAN 102. Router 110 connects to network connection device 104 through an accelerator device 114. The accelerator device 114 includes traffic management functions to ameliorate the uplink data congestion at the network connection device 104. In one embodiment, an accelerator device 114 can be combined with conventional SOHO/home routers or gateways to provide the enhanced traffic management features found in the LAN gateway device 106.

Figure 3:
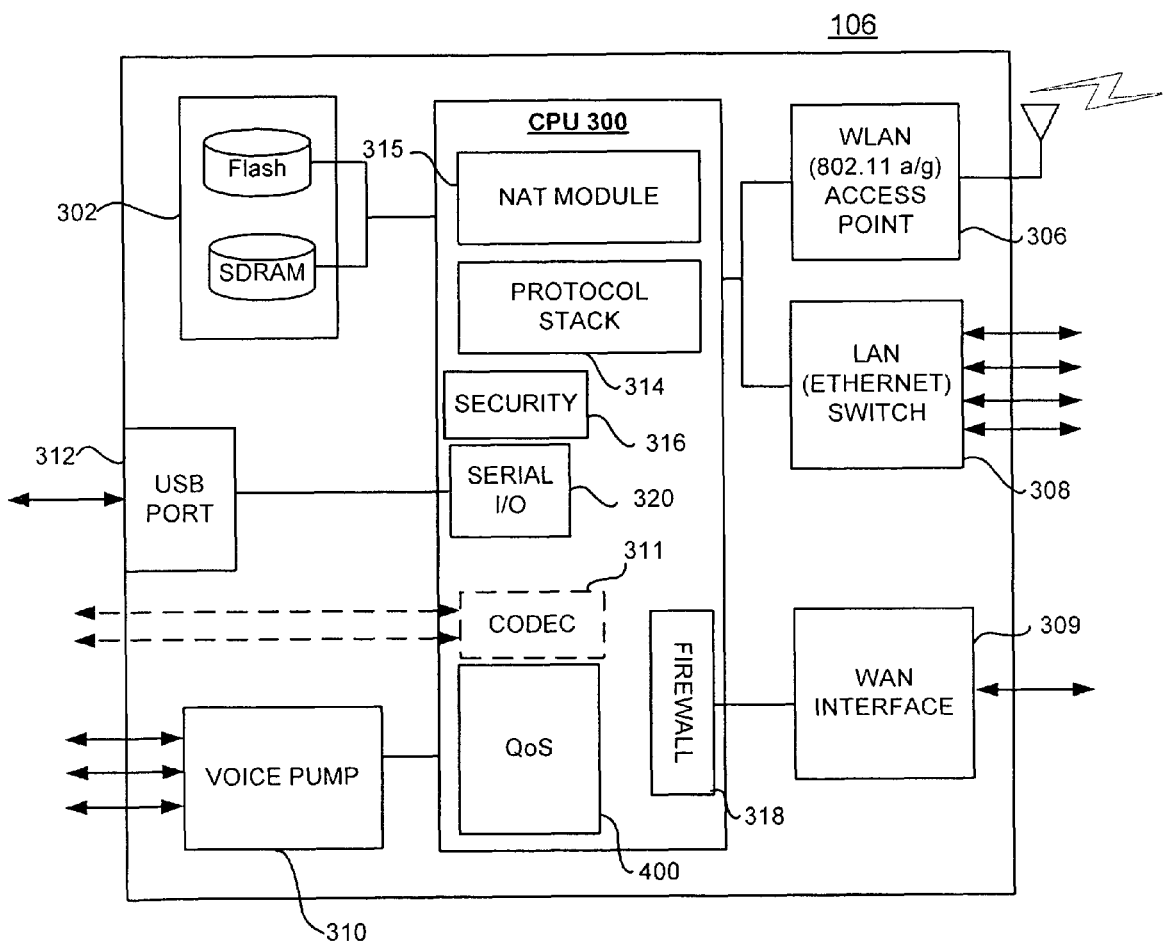
FIG. 3. is a block diagram of select components in one embodiment of a LAN gateway device in accordance with the present invention.

Referring now to FIG. 3, a block diagram of select components in one embodiment of a LAN gateway device 106 is shown. It should be noted that although these components are illustrated with respect of a LAN gateway device 106, similar components would be included in an accelerator device 114. In one embodiment, LAN gateway device 106 includes a core-processing unit ("CPU") 300. The CPU 300 provides computing capability to execute programmable software modules in the gateway device 106. For example, in one embodiment CPU 300 is an embedded microprocessor with an architecture designed for data communications, for example, an IP3023™ wireless network processor by Ubicom™, Inc. of Mountain View, Calif. In an alternative embodiment, CPU 300 is a generic programmable microprocessor programmed to implement the functionality described herein based on several software modules.

LAN gateway 106 includes a memory module 302 with a plurality of memory devices 304 (e.g., Flash memory 304a, SDRAM 304b, and the like). In one embodiment, the memory module 302 stores software instructions and data used for the operation of LAN gateway device 106. In an alternative embodiment, a memory module 304 is optional as an addition to internal memory within the CPU 300.

The LAN gateway device 106 includes several interface modules. A wireless network adapter 306 provides an interface from the CPU 300 to the wireless data network. The wireless network adapter 306 can implement one or more wireless data communications protocols, e.g., IEEE 802.11 (a, b, g, and the like), Bluetooth, or other standard or proprietary protocols to interface with computers 109 or other peripheral devices 108 in the wireless SOHO/home LAN. A LAN switch 308 provides an interface for the CPU 300 to wired LAN devices. For example, in one embodiment, a 10/100 Ethernet switch provides four Ethernet ports for four computers 109.

The LAN gateway device 106 connects to the network connection device 104 through a WAN interface module 309 for broadband services. In one embodiment, the WAN interface module 309 includes modem functionality connecting directly to the WAN data service provider, for example, as a DSL, VDSL, or cable modem.

In addition, in one embodiment, LAN gateway device 106 includes several optional interface features. For example, in one embodiment, a LAN gateway device 106 includes a voice pump 310 to connect one or more analog telephones for performing the user interface function of a VoIP application. In an alternative embodiment, CPU 300 includes a codec 311 to interface with digital IP phones. Codec 311 can be included in addition to or in lieu of a voice pump 310 interface for analog telephones. Similarly, a universal serial bus ("USB") interface 312 is provided to couple a serial input/output port of CPU 300 to a network peripheral 108, for example, a network printer.

In one embodiment, internal to the CPU 300, a protocol module 314, comprising hardware and software resources, is configured to implement packet routing and protocol conversions. For example, a software program comprising a set of instructions to implement a protocol stack is stored in an instruction memory coupled to a 32-bit multithreaded pipelined embedded microprocessor for implementing the software program. In one embodiment, the software within CPU 300 is upgradeable through an I/O port. The internal software or firmware can be changed so that any number of protocols can be supported by the LAN gateway device 106. The protocol module 314 parses data packets based on the protocols supported by its software program. The protocol module 314 extracts a unique stream-identifier from each packet. For example, in one embodiment, the unique stream identifier includes a source address and port and destination address and port extracted from TCP/IP header information in the packets.

Further, in one embodiment, CPU 300 includes other modules for implementing a plurality of additional gateway features. For example, a traffic stream classifier module 315 stores information on the various streams going through the LAN gateway device 106. For example, in one embodiment a traffic stream classifier module implements network address translation functions. In one embodiment, a traffic stream classifier module 315 is further enhanced to support additional data fields associated with each active stream in the LAN gateway device 106. For example, the unique stream identifier is stored in a NAT table with a plurality of associated data fields. Subsequently, other modules that store or retrieve information associated with the stream identifier access the NAT table for storing or retrieving information in its data fields. Other modules included in CPU 300 are a security module 316 that implements user authentication features for access to system configurations; a firewall module 318 that intercepts unauthorized WAN communications; a Serial input/output port 320 that provides serial data interface, for example for USB, 10Base-T, or other serial communications. In one embodiment, each module within CPU 300 comprises a software thread that is executed by a shared multithreaded pipelined embedded microprocessor, as for example the microprocessor described in co-pending U.S. patent application Ser. No. 09/748,098, filed Dec. 21, 2000, titled "System And Method For Instruction Level Multithreading In An Embedded Processor Using Zero-Time Context Switching," incorporated herein by reference in its entirety.

Figure 4:
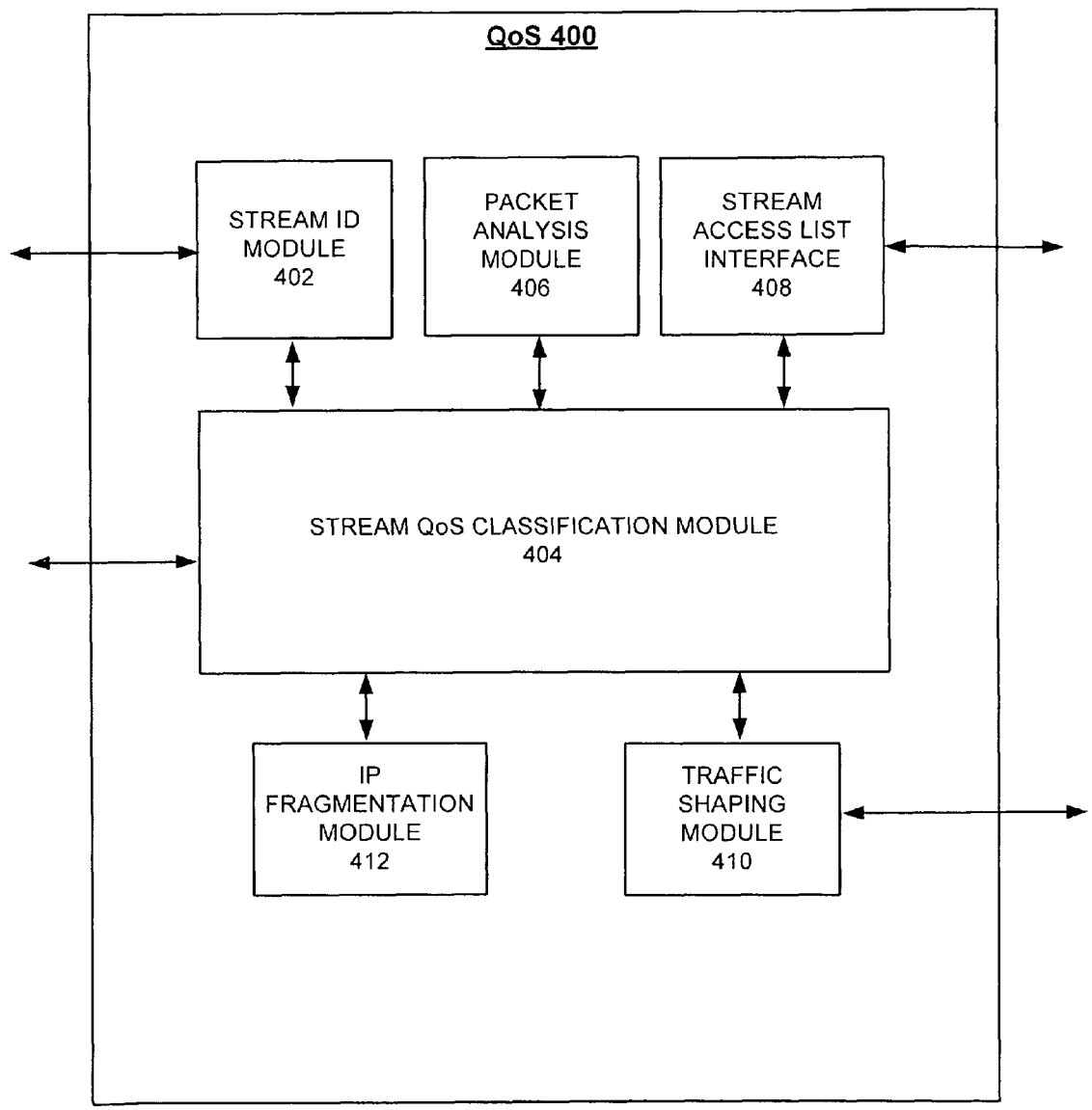
FIG. 4. is a block diagram of one embodiment of a QoS module in accordance with the present invention.

Additionally, in one embodiment, CPU 300 includes a QoS module 400 to provide traffic management functions. Now referring to FIG. 4, a block diagram of one embodiment of a QoS module 400 is shown.

The QoS module 400 includes a stream identification ("ID") module 402. The stream ID module 402 obtains the stream identification information for the currently processed packet. For example the stream ID module 402 consults a NAT table in the traffic stream classifier module 315 that is used to store stream ID information for the currently active streams. A communication stream is formed between two endpoints, either within the local network 100 (e.g. from computer 109a to 109b) or between a local computer 109 and a remote endpoint through the WAN 102 (e.g., a host server or peer computer). Generally, streams between endpoints within the local network 100 are simply routed through the LAN gateway device 106. When a stream is established with a remote endpoint, data packets are transmitted out of the LAN gateway device 106 through the connection device 104 and through WAN 102 to the remote endpoint. As previously mentioned, at least in the upstream direction, the network link is significantly slower than the local network 100. The QoS module 400 provides traffic management services to ameliorate data latency problems due to this slower uplink broadband connection to the WAN 102 through connection device 104.

The QoS module 400 also includes a packet analysis module 406. The packet analysis module 406 interfaces with other portions of the CPU 300 to obtain a traffic type based on characteristics of the data stream. A traffic type can be derived from information about the packets in a data stream, such as packet sizes, transport protocol, amount of bandwidth consumed, and the like. For example, in one embodiment, packet analysis module 406 interfaces with the CPU 300 processing unit to compute a running average packet length for each active data stream, e.g., an exponential running average of the packet size for each stream.

In this embodiment, the number of bits in a packet is determined and stored in a field associated with a stream. For example, a NAT table includes an average packet size field associated with each stream ID that is used for storing this information. Subsequently, for each packet belonging to the same stream that is transmitted through the gateway device 106, its number of bits determined and averaged with the previously stored number and the value in the field is updated accordingly. This information is used to automatically determine the likely latency requirement or priority for each stream. Generally, applications with strict latency requirements (e.g., multi-user gaming, VoIP, video telephone, and the like) tend to format data in short packets and send packets in short intervals. Conversely, applications for which long latency is not a problem tend to optimize throughput by maximizing their packet payload and generally provide very large packets. Using this general relationship between packet size and latency requirements, a priority scheme is devised with a correlation between a set of packet sizes or ranges and corresponding priority levels. Similarly, other proxies for latency requirement can be determined from analyzing packet information, such as protocol used, bandwidth consumption, and the like, and thereby automatically determine a QoS priority for each data stream without requiring user configuration.

In one embodiment, an exponentially weighted filter algorithm is used for calculating the priority for each data stream. The following is one example of such an algorithm implemented in C programming language:

```
#define AUTO_QOS_WEIGHT 1676/* This value can be
    modified to tune the
    implementation */
#define AUTO_QOS_FSHIFT 11/* Number of bits of fixed point
    value */
#define AUTO_QOS_FIXED_1 (1 <<
    IPNAT_AUTO_QOS_FSHIFT)
avg_pkt_len *= AUTO_QOS_WEIGHT;
avg_pkt_len += len * (AUTO_QOS_FIXED_1 -
    AUTO_QOS_WEIGHT);
avg_pkt_len >>= AUTO_QOS_FSHIFT;
```

According to this embodiment, for some previous average packet size, "avg_pkt_len" the new average is determined after processing a packet of size "len" to determine its size. With this exponentially weighted filter approach, greatest weighting is given to the most recent packet sizes received. Accordingly, rapid response to dramatic changes in packet sizes are possible while still taking past stream behavior into account.

Referring back to FIG. 4, in one embodiment, the QoS module 400 includes a stream access list interface 408. In this embodiment, the LAN gateway device 106 provides a user interface for the user to configure priority levels for one or more applications. The user defined priority levels are stored in an access list accessible to the QoS module 400 through the stream access lots interface 408. In addition, a set of predetermined priority levels can be preconfigured in the access list by a manufacturer, for example, for known low latency applications, such as popular P2P games, VoIP software applications, and the like. In one embodiment, the access list is implemented as a set of Application Layer Gateway ("ALG") rules associated with the traffic stream classifier module 315 of the LAN gateway device 106. For example, port triggers for ports used by applications with low latency requirements are configured to correspond to a relatively high priority.

The stream QoS classification module 404 assigns a QoS priority to each stream. This module associates a data management behavior with each data stream between local and remote endpoints. In one embodiment, the stream QoS classification module 404 interfaces with the stream ID module 402 and the packet analysis module 406 to automatically determine and assign a QoS priority level to an identified stream. In an alternative embodiment, the stream QoS classification module 404 further interacts with the stream access list interface 408 to allow overriding the automatic process with user-configured information.

For example, in one embodiment, the LAN gateway device 106 includes a prioritization queue to buffer priority sorted packets. In this embodiment, as new packets arrive and their priority is determined, they are placed in the queue according to priority. New packets with a higher priority than pre-existing packets in the queue are placed ahead of those of lower priority. Packets with the same priority as pre-existing packets are placed immediately behind the pre-existing ones. Accordingly, a priority-sorted queue is used to manage the priorities. In this embodiment automatic priorities can range, e.g., from 128 to 255 and user-configured priorities range, e.g., from 0 to 255. Thus, in this embodiment, users are able to assign priorities in the same range as automatically determined priority levels. This allows a set of fixed priority rankings to be made by the user such that user-configured rules override the automatic priorities but also allows user-configured rules to force priorities to be lower than most automatic priorities.

In an alternative embodiment a plurality of queues, e.g., 255, are used for buffering data packets before sending to the connection device 104. Each queue is associated with a QoS priority level. Any number of queues can be used—more queues guarantee a fixed proportion of the bandwidth to high priority QoS-tagged traffic and some smaller proportion can be fixed to non-QoS traffic. In one embodiment these queues are divided into two sections, a user configured priority section and an automatic priority section. Three priorities are allowed for user configuration: QoS_None=127, QoS_Medium=64, and QoS_High=1. A user can assign any of these priorities to any application in the user's system through the stream access list. The automatic priorities are assigned in a range that extends from, e.g., 128 to 255. Any one priority for a stream is based on the results of the packet analysis module 406. Since all user defined priorities are higher in value than automatic priorities, user defined priorities always take precedence over automatic priorities. The stream QoS classification module 404 checks the stream access list through the stream access list interface 408 to determine if there is a user configured priority for the identified stream. If there is, that user provided priority is assigned to the stream; otherwise an automatic priority is assigned. In one embodiment, the priority assignment is stored in the NAT list using a stream priority field associated with each stream.

In addition, in one embodiment, the QoS module 400 includes a traffic-shaping module 410 and an IP fragmentation module 412. It should be noted that alternative embodiments do not include these optional modules or include them otherwise within CPU 300. In this embodiment, the QoS module 400 repackages application data dynamically in response to link status changes. The traffic-shaping module 410 measures available bandwidth and delay in the WAN upstream link, for example using a ping command, running an algorithm, or based on user input, and controls the output of the LAN gateway device 106 to the connection device 104 to match its upstream data rate. This process is used to manage the input buffer of the connection device 104 to maintain the buffer in the connection device 104 at full capacity for optimal throughput performance. In addition, in one embodiment, the IP fragmentation module 412 enables fragmentation of larger datagrams into multiple packets. Further, the IP fragmentation module 412 coordinates with downstream host devices to vary the IP maximum transmission unit ("MTU") in order to minimize fragmentation at the LAN gateway device 106. IP fragmentation is used to break up large lower priority packets into smaller packets in order to avoid long delays between transmissions of high priority packets associated with high QoS software applications.

Figure 5:
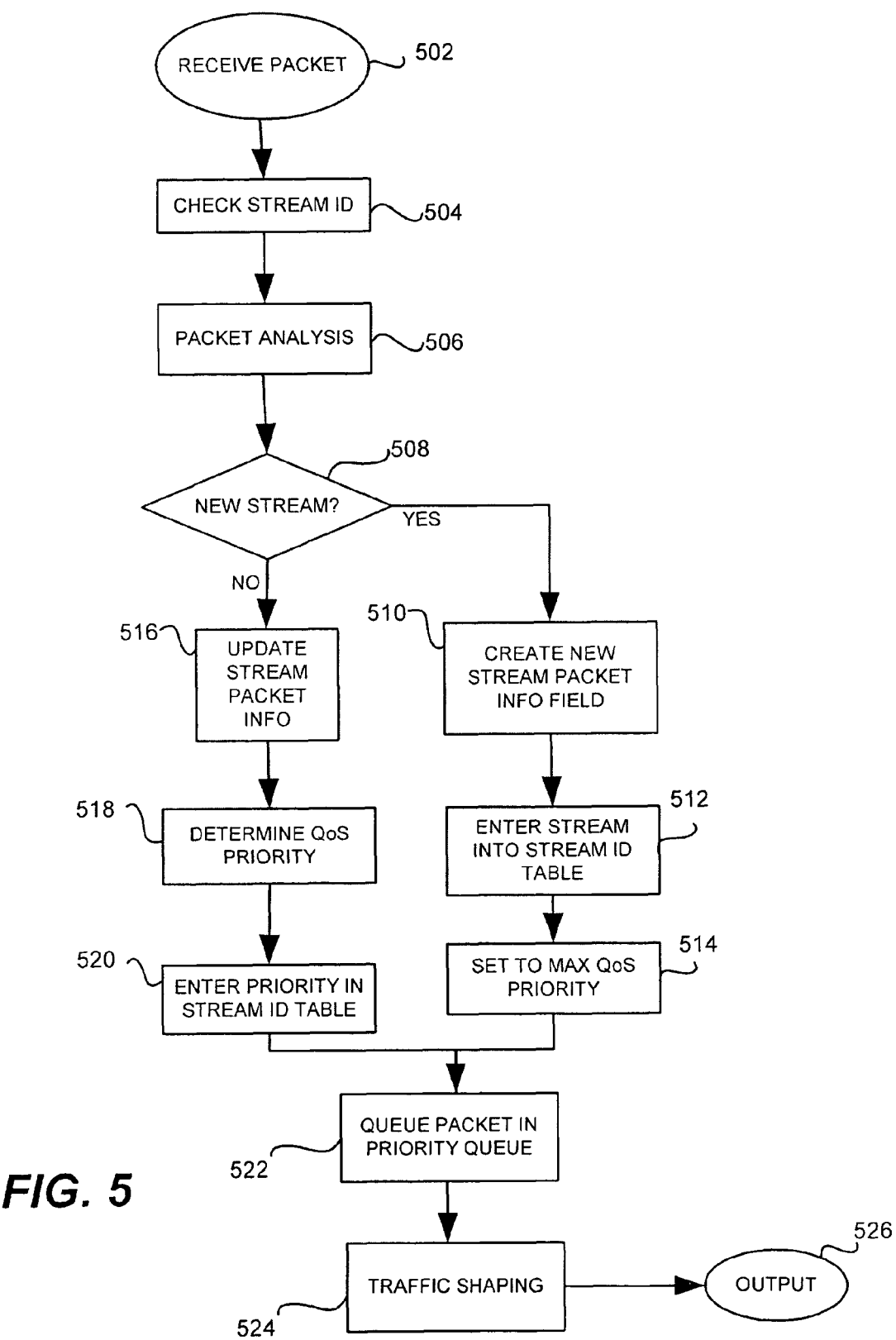
FIG. 5. is a flow chart for one embodiment of a method for the operation of a LAN gateway system in accordance with the present invention.

Now referring to FIG. 5, a flow chart for one embodiment of a method for the operation of a LAN gateway system is shown. A data packet is received 502 as part of a connection stream. The stream may be established within the local network 100 or between the local network 100 and the WAN 102. The packet includes a header with protocol-defined information. From this header information, the stream is uniquely identified 504. In one embodiment, the stream identification consists of the unique network identifier for the two endpoints of the stream, e.g., [source IP address:port] and [destination IP address:port]. In one embodiment, the protocol identifier associated with that stream is also used for identification purposes in combination with the endpoint network identifiers.

Once the stream is uniquely identified from the packet header information, the packet is analyzed 506 for subsequent priority determination purposes. For example, in one embodiment, a running average packet size is calculated and maintained for each active stream. For each packet, its number of bits is determined (e.g., through a hash function, and after the initial storage the average for the identified stream is updated. The stream identifier is used to determine 508 whether the current packet belongs to a stream of a previously established connection or whether a new connection is being requested.

If a new stream is being formed, e.g., the stream ID is not recognized, a new packet information field is created 510 to store the result of the packet analysis. For example, in one embodiment, the packet size for the current packet is stored in a data object associated with the current stream ID. The stream ID is also stored 512 for subsequent identification of the current stream as an established connection. In one embodiment, enhanced NAT facilities are used to keep the information regarding the active streams, for example, a NAT table with fields for packet analysis information and priority level serves as the data object for stream related information.

In one embodiment, after information about a new stream is stored 512, the stream priority is automatically set to high priority. In effect, every new stream is given a default high priority. An assumption is made that every stream is high priority unless otherwise determined. The default high priority assumption assures that every connection attempted can be established without interference from other network traffic. The first few packets in a stream relate generally to the connection set-up process. By assigning high priority to new streams as a default, these first few packets are treated with higher priority than already established connections and thus are more likely to be transmitted ahead of packets buffered in lower priority queues. For example, in peer-to-peer applications that establish a large number of connections, (e.g., Kazaa Media Desktop, of Sharman Networks Ltd., Port Vila, Vanuatu) as the number of connections increases the TCP/IP protocol divides up the available bandwidth. As the bandwidth becomes used up by multiple slower connections, establishing new connections becomes more difficult. The preexisting streams may cause the new connection request packets to be delayed to such extent that the connection times out before the packets get a chance to go through the WAN uplink. The default high-priority approach eliminates this problem by automatically prioritizing packets forming new connections. After the connection is formed, even if the QoS priority is decreased, the TCP/IP algorithm readjusts the available bandwidth taking into account the newly established connections.

Conversely, packets received that are part of an established connection stream are recognized 508 based on their stream identifier information. For these recognized packets, the packet analysis information is used to update 516 the corresponding field or counter for the stream to which the packet belongs. In one embodiment, the packet analysis information is used to automatically determine 518 the proper QoS priority for the identified stream. For example, initially the QoS priority is set to the maximum priority and the first time the priority determination 518 is made based on packet analysis data, the QoS priority is lowered according to a calculated average packet size. In one embodiment, the first priority determination 518 takes place after an initial number of packets have been analyzed in order to have a sufficiently reliable average packet size value. Alternatively, in another embodiment the QoS priority is determined based on a combination of packet analysis information or preconfigured or user provided priority information. The QoS priority information is stored 520 in association with the stream ID, for example, in a field for storing QoS priority information that is part of an enhanced NAT table.

Once the priority is determined, either by default for new streams or otherwise for existing streams, the current packet is buffered 522 in the appropriate queue based on the QoS priority for its stream. Traffic from the queues is ordered for output 524 to the buffer in the WAN 102 connection device 104 according to their assigned priorities. Queues with higher priority are given precedence over lower priority queues. As described above, in one embodiment a single priority-sorted queue is used and packets are output to the connection device 104 in the order they have been placed in the queue. The packet output is paced such that the fewest possible packets are pushed into the transmit queue of the connection device 104. The packets are paced so as to keep the buffer in connection device 104 as shallow as possible. Further, in one embodiment, when system resources become limited, stream QoS priority is used to implement a priority-based deletion of traffic from the queues.

Figure 6:
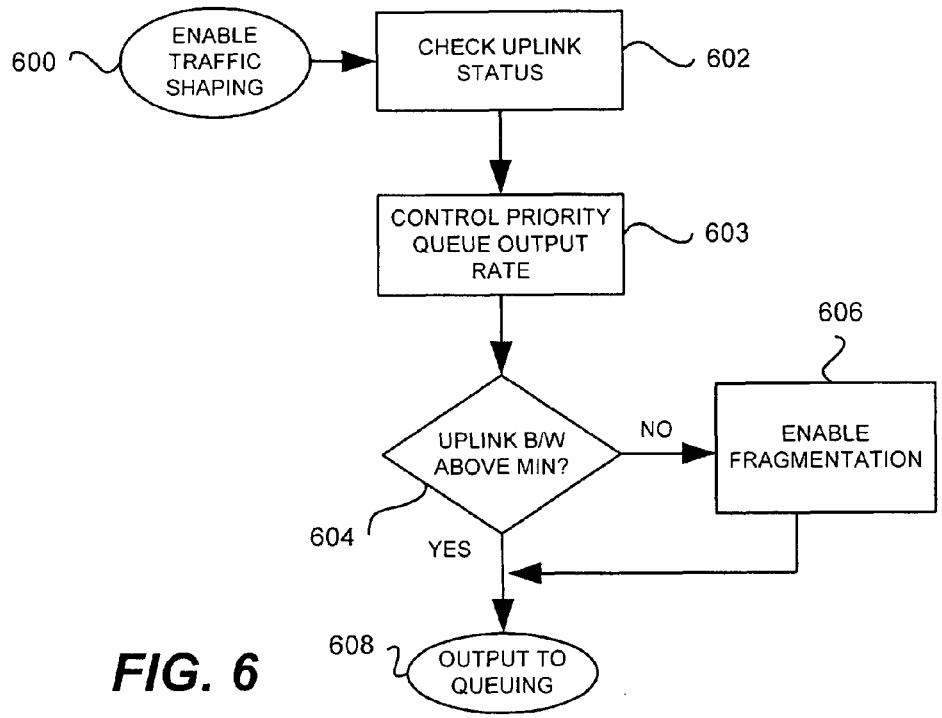
FIG. 6. is a flow chart diagram of one embodiment of a traffic shaping method in accordance with the present invention.

Now referring to FIG. 6, a flow chart diagram of one embodiment of a traffic shaping method is shown. In one embodiment, traffic shaping is included in the general operation prior to buffering 522 packets in the priority-sorted queue. In an alternative embodiment, the traffic shaping is performed selectively based on the QoS priority of established connections, e.g., when high priority streams are present, streams with lower priority (e.g., below a threshold level) undergo a traffic shaping process. In another embodiment, all packets are subject to traffic shaping if high-priority QoS features are enabled.

Generally, the uplink channel status is checked 602 to determine the current delay or actual data rate in the uplink channel. For example, a modem upstream transmission rate is checked to determine how long it will take the modem to send a packet to the WAN. The upstream data rate can be determined according to any conventional approach, for example, by either interrogating the connection device directly, by user input during configuration, or by running a rate estimation algorithm based on current data traffic. Once the upstream data rate is determined, a traffic shaper module controls 603 the data output from the priority queues to prevent packets from being sent to the modem faster than the modem can send them upstream. For example, in one embodiment, the priority-sorted buffer output rate is controlled so that the capacity of the modem's buffers is not reached with pending packets.

In one embodiment, in order to maintain high QoS transfer rates, when upstream data rates are slow, e.g., the upstream measured bandwidth is 604 below a minimum threshold, an optional fragmentation feature can be enabled 606. Upon enabling 606 fragmentation, the packet sizes are reduced to improve QoS in the uplink data transfer. Fragmentation of larger packets that are due to be sent allow any higher priority packet arriving during the transmission the fragmented packet to be sent before some subsequent fragment. The fragment size may be specified as a fixed upper size (configured by the user) or may be automatically determined by the system based on the uplink speed. In one embodiment the fragment size is limited based on uplink data rate to a size that can be transmitted within 20 ms. Conventional IP fragmentation is supported at the gateway device to break up larger datagrams into multiple packets. In addition, in one embodiment, MTU clamping of the TCP data streams is used to change the standard MTU of the transmitting endpoints in order to minimize the fragmentation at the gateway device. By requiring a smaller MTU, the host endpoints within the LAN compose smaller size packets thereby reducing the fragmentation requirements at the gateway device.

Figure 7:
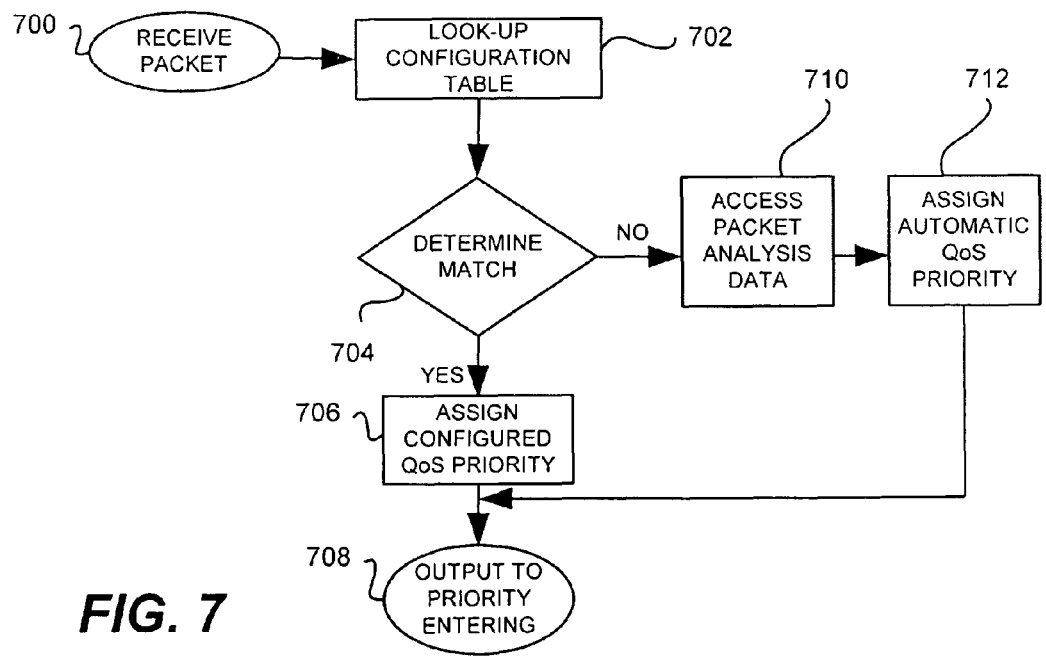
FIG. 7. is a flow chart diagram of one embodiment of a priority assignment algorithm in accordance with the present invention.

Now referring to FIG. 7, a flow chart diagram of one embodiment of a priority assignment algorithm is shown. In one embodiment, a priority assignment algorithm is implemented to determine 518 the QoS priority for active streams. Stored configuration information is looked up 702 to determine whether there is information for the current stream. The configuration information relates a behavior of the gateway with a traffic type. For example, the port in the stream ID is used to find a match with the stored information, which is based on port triggers, ALGs, or similar rules-based schemes. In one embodiment, a user access table configured through a user interface includes port and protocol information typically associated with a particular software application (e.g., VoIP application, gaming application, or the like) and a corresponding priority designation (e.g., High, Medium, Low, None, or the like) for streams set-up by those applications. It should be noted that configuration information is pre-configured by the manufacturer or supplier (obviating the need for user interface based configuration) or provided by the user, or both. For example, in one embodiment the configuration information id stored in non-volatile memory within the gateway device at the factory. In an alternative embodiment, the configuration information is downloaded via the WAN into a flash memory at set up time and optionally automatically updated at subsequent time intervals.

As described above, the packet header information (e.g., stream ID) is used to determine 704 if the packet or stream matches the configuration information. If there is a match, the configuration information is used to assign 706 a QoS priority to the stream as indicated above. Once the priority is assigned 706, the QoS priority determination is completed 708. If conversely, the stream does not match 704 any of the configuration information, the packet analysis information for the current stream is accessed 710. Based on the packet analysis information, a QoS priority is automatically determined 712 for the stream and the process is completed 708.

In one embodiment, the pre-configured QoS priorities are of higher priority than automatically determined ones. Once a stream is assigned a pre-configured QoS priority the prioritization process is skipped for subsequent packets of that stream. In one embodiment, the packets are directly buffered in the appropriate priority queue. In an alternative embodiment, the packets are entered in the priority-sorted queue at the proper priority location, i.e., after higher priority packets but before lower priority ones. For example, referring back to FIG. 5, upon determining 508 whether the packet belongs to an existing stream, the QoS priority information stored with respect to that stream can also be checked and if it corresponds to a pre-configured priority level, e.g., higher level than highest automatic priority level or otherwise identified as pre-configured, the packet is queued 522 accordingly. Since the pre-configured priorities are assigned to the streams based on a match with respect to their identifying information, which does not change within a given session, the priority assignments based on the pre-configured priorities do not change during a session.

Conversely, automatically assigned QoS priorities can dynamically change after each packet is analyzed because the packet analysis information may change within a session. In one embodiment, initially, the QoS priority is set to the highest automatic priority level available in the system. Subsequently, based on changes in the packet analysis information, the priority of the stream is either kept at the same level or changed. Generally, if the priority level is changed within a session, it is lowered. The purpose of limiting changes within a session for any given stream to lowering the stream priority is to ensure that having identified a stream as being low priority it is not subsequently deemed to be of higher priority.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A gateway device for interfacing a local area network with a wide area network, the gateway device comprising:
   a local area network interface for communicating data packets between the gateway device and local area network computers;
   a wide area network interface for communicating data packets between the gateway device and remote systems across the wide area network; and
   a core processing unit coupled to the local area network interface and the wide area network interface for routing data packets from the local area network computers to the remote systems across the wide area network, the core processing unit comprising a quality of service module configured to automatically assign a real-time quality of service priority to at least one data stream established between a local area network computer and a remote system based on a traffic type derived from packets in the data stream, the quality of service module assigning priority levels within a first range of values, the traffic type determined from an analysis of content of data packets included in with the data stream, the quality of service module further configured to determine a user configured quality of service priority for the data stream, the user configured quality of service priority overriding the real-time quality of service priority, the user configured quality of service priority lower than the first range of values.

2. The gateway device of claim 1, further comprising a plurality of memory devices coupled to the core processing unit for storage of software instructions and data.

3. The gateway device of claim 1, wherein the core processing unit further comprises a traffic stream classifier module for performing network address translation functions and configured to store information associated with the data stream that is accessed by the quality of service module to automatically assign quality of service priority to the data stream.

4. The gateway device of claim 1, wherein the quality of service module further comprises a traffic-shaping module configured to measure a link status of a network link between the wide area network and the gateway device and further configured to adjust the data transmission rate dynamically to match an available data transfer rate according to the measured link status.

5. The gateway device of claim 1, wherein the local area network interface comprises a wireless radio for wirelessly communicating with local area network computers.

6. The gateway device of claim 1, further comprising a telephone interface configured to provide voice-over-internet-protocol ("VoIP") data communications for one or more telephone systems.

7. The gateway device of claim 6, wherein the telephone interface includes one of a data pump for analog telephone systems or a codec for digital IP telephone systems.

8. A computer readable memory having instructions encoded thereon, the instructions, when executed by a computer processor, implementing a quality of service module for a network device interfacing between network links of different data transfer capacities, the quality of service module for assigning a priority level to one or more streams of data packet corresponding to one or more software applications, each application having an associated maximum latency requirement, at least one stream established between two computer network endpoints, the transmission of the stream including routing from a first network link to a second network link of lower data capacity, the quality of service module comprising:
   a stream identification module for determining a unique identifier associated with the stream;
   a packet analysis module configured to analyze content included in packets in the stream and to derive an analysis result associated with the stream based on the analysis of the content included in the packets in the stream;
   a stream quality of service classification module coupled to the stream identification module to receive the unique identifier associated with the stream and coupled to the packet analysis module to receive the analysis result, the stream quality of service classification module for automatically determining a real-time quality of service priority based on the analysis result associated with the stream based on the analysis of the content included in the packets in the stream, the quality of service classification module assigning priority levels within a first range of values; and
   a stream access list interface for deriving user configured quality of service priority, wherein the stream quality of service classification module is configured to override the automatically determined real-time quality of service priority for the stream in response to deriving from the stream access list a user configured quality of service priority for the stream, the user configured quality of service priority lower than the first range of values.

9. The quality of service module of claim 8, wherein the analysis result is a running average packet size for packets associated with the stream.

10. The quality of service module of claim 9, wherein the stream quality of service classification module is configured to automatically determine a quality of service priority for the stream that results in a data transfer delay that is proportional to the running average packet size associated with the stream.

11. The quality of service module of claim 10, wherein the data transfer delay results from scheduling the output of a plurality of buffers based on a buffer priority designation.

12. The quality of service module of claim 10, wherein the data transfer delay results from placing packets associated with the stream in a priority-sorted queue according to a priority designation.

13. The quality of service module of claim 8, further comprising:
   a traffic-shaping module for determining available upstream data rate of the second network link and for controlling data transfer rate from the network device to the second network link according to the available upstream data rate; and
   an internet protocol ("IP") fragmentation module coupled to the traffic-shaping module for enabling fragmentation of packets according to the available upstream data rate.

14. The quality of service module of claim 8, wherein the stream identification module is configured to access a traffic stream classifier module for determining the stream identification, and further wherein the stream quality of service classification module is configured to access the traffic stream classifier module for storing the quality of service priority associated with the stream.

15. The quality of service module of claim 14, wherein the stream quality of service classification module is further configured to access the traffic stream classifier module for storing and retrieving the analysis result associated with the stream.

16. The quality of service module of claim 8, wherein the software applications include at least one high quality of service software application that requires low-latency packet transfers for improved operation.

17. The quality of service module of claim 16, wherein the high quality of service software application includes one of a voice-over-internet-protocol ("VoIP") telephony application or an on-line multi-player game.

18. A computer readable memory having instructions encoded thereon, the instructions, when executed by a computer processor cause the computer processor to execute the steps of:
  receiving a data packet, the data packet including a header with information identifying a source network device and a destination network device;
  deriving a stream identification code from the information in the header of the packet to uniquely identify a stream with which the packet is associated based in part on the source network device and the destination network device;
  analyzing content of the data packet to compute a data analysis result for characterizing the stream with which the packet is associated;
  determining a real-time quality of service priority for the stream with which the packet is associated based on the data analysis result of the content of the data packet, the real-time quality of service priority assigned within a first range of values; and
    determining a user configured quality of service priority for the stream with which the packet is associated, the user configured quality of service priority overriding the real-time quality of service priority, the user configured quality of service priority lower than the first range of values.

19. A method of automatically assigning network traffic priorities to streams of data packets, the method comprising:
  receiving a data packet, the data packet including a header with information identifying a source network device and a destination network device;
  deriving a stream identification code from the information in the header of the packet to uniquely identify a stream with which the packet is associated based in part on the source network device and the destination network device;
  analyzing content of the data packet to compute a data analysis result for characterizing the stream with which the packet is associated;
  determining a real-time quality of service priority for the stream with which the packet is associated based on the data analysis result of the content of the data packet, the real-time quality of service priority within a first range of values; and
  determining a user configured quality of service priority for the stream with which the packet is associated, the user configured quality of service priority overriding the real-time quality of service priority, the user configured quality of service priority lower than the first range of values.

20. The method of claim 19, further comprising determining whether the packet is associated with an established stream.

21. The method of claim 20, wherein determining the real-time quality of service priority for the stream based on the data analysis result comprises assigning a highest automatic priority in response to determining that the packet is not associated with an established stream.

22. The method of claim 20, wherein determining the real-time quality of service priority for the stream based on the data analysis result comprises automatically assigning a lower priority to the stream than a priority previously assigned in response to a change in the data analysis result.

23. The method of 20, wherein the data analysis result comprises the calculation of a running average packet size associated with the stream.

24. A system for automatically assigning network traffic priorities to streams of data packets, the system comprising:
  means for receiving a data packet, the data packet including a header with information identifying a source network device and a destination network device;
  means for deriving a stream identification code from the information in the header of the packet to uniquely identify a stream with which the packet is associated based in part on the source network device and the destination network device;
  means for analyzing content of the data packet to compute a data analysis result for characterizing the stream with which the packet is associated;
  means for determining a real-time quality of service priority for the stream with which the packet is associated based on the data analysis result of the content of the data packet, the real-time quality of service priority assigned within a first range of values; and
  means for determining a user configured quality of service priority for the stream with which the packet is associated, the user configured quality of service priority overriding the real-time quality of service priority, the user configured quality of service priority lower than the first range of values.

* * * * *